(12) United States Patent
Johnson

(10) Patent No.: US 8,474,002 B2
(45) Date of Patent: Jun. 25, 2013

(54) METHOD AND SYSTEM FOR ADAPTIVE DISK MANAGEMENT

(75) Inventor: Lee R. Johnson, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 473 days.

(21) Appl. No.: 11/930,724

(22) Filed: Oct. 31, 2007

(65) Prior Publication Data

US 2009/0112899 A1 Apr. 30, 2009

(51) Int. Cl.
*H04N 7/173* (2011.01)

(52) U.S. Cl.
USPC .................. 725/134; 725/131; 725/151

(58) Field of Classification Search
None
See application file for complete search history.

(56) References Cited

U.S. PATENT DOCUMENTS

| 6,937,171 | B2* | 8/2005 | Baldwin et al. ............... 341/87 |
| 7,496,460 | B2* | 2/2009 | Hornick et al. ............... 702/64 |
| 7,640,571 | B1* | 12/2009 | Reichgott et al. ............ 725/142 |
| 2002/0157092 | A1 | 10/2002 | Kitsukawa et al. ............ 725/9 |
| 2004/0133906 | A1 | 7/2004 | Przybylek ..................... 725/9 |
| 2005/0086692 | A1* | 4/2005 | Dudkiewicz et al. .......... 725/46 |
| 2005/0138658 | A1* | 6/2005 | Bryan ............................. 725/46 |
| 2005/0160458 | A1* | 7/2005 | Baumgartner ................. 725/46 |
| 2005/0193414 | A1 | 9/2005 | Horvitz et al. ................ 725/46 |
| 2006/0184287 | A1* | 8/2006 | Belady et al. ................ 700/291 |
| 2006/0242665 | A1 | 10/2006 | Knee et al. .................... 725/38 |
| 2006/0288390 | A1* | 12/2006 | Kang et al. ..................... 725/89 |
| 2009/0300683 | A1* | 12/2009 | Rynkowski ..................... 725/58 |
| 2010/0215341 | A1* | 8/2010 | Ellis et al. ...................... 386/83 |

FOREIGN PATENT DOCUMENTS

| CN | 1373966 A | 10/2002 |
| WO | WO 02/42959 A2 | 5/2002 |

OTHER PUBLICATIONS

International Search Report dated Feb. 3, 2009 cited in Application No. PCT/US2008/079770.
Chinese First Office Action dated Apr. 28, 2011 cited in Application No. 200880114092.9.
Chinese Second Office Action dated Apr. 6, 2012 cited in Application No. 200880114092.9, 11 pgs.

* cited by examiner

*Primary Examiner* — Chenea Smith
(74) *Attorney, Agent, or Firm* — Merchant & Gould

(57) ABSTRACT

Provided herein are at least one embodiment of systems and methods of adaptive disk management for a recording device employing a memory storage device such as hard disk storage so that memory storage device usage is tracked in the recording device and the memory storage device is controlled based on time-based patterns of user behavior.

24 Claims, 5 Drawing Sheets

METHOD AND SYSTEM FOR ADAPTIVE DISK MANAGEMENT

BACKGROUND

Technical Field

The present invention is generally related to media storage/playback systems and more particularly, is related to a system and method for maintaining storage and playback of media content.

With recent advances in digital transmission technology, subscriber television systems are now capable of providing much more than the traditional analog broadcast video. In implementing enhanced programming, the home communication terminal device ("HCT"), otherwise known as the set-top terminal (STT), has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at a user site. Typically, some of the software executed by a DHCT is downloaded and/or updated via the subscriber television system. Each DHCT also typically includes a processor, communication components, and memory (e.g., RAM, ROM and hard drive), and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user would like to view. Further, because of the large number of viewing choices, the user may miss viewing opportunities. Storage devices such as hard drives coupled with the DHCT help alleviate this problem by providing a mechanism to store media content for later retrieval for viewing. However, media content storage systems can cause a delay when not ready to access stored media content at the time of retrieval by a user. Similarly, hard disk life can be shortened and power consumption unnecessarily increased if the hard disk stays in an active state when not needed. Therefore, there exists a need to efficiently manage the storage and retrieval of media content.

SUMMARY

Provided herein are systems and methods of adaptive disk management for a DHCT or any other media storage device employing a memory storage device such as hard disk storage as is known in the art so that memory storage device usage is tracked in a media recording/playback device (e.g., a "recording device" such as, for example, a DHCT, a digital video recorder (DVR), computer, etc.), and controlling the memory storage device based on patterns of user behavior.

In one aspect, a method of predictive management of a recording device is described. The method comprises setting a collection period comprised of a plurality of days, dividing the collection period into a number of time segments, and allocating a memory area to each time segment. User data is saved during the collection period. The user data is comprised of events caused by user activity or non-events indicating a lack of user activity. User data is saved in the memory area for the time segment in which it occurs. Patterns of user behavior are determined by analyzing the memory areas for the time segments that comprise the collection period and corresponding user data associated with each time segment. The recording device is operated in accordance with the determined patterns of user behavior.

In another aspect, a recording device with predictive disk management is described. The recording device is comprised of a memory, a time shift buffer comprised of a hard disk drive, and a processor. The processor is configured to execute executable code stored on the memory. The executable code performs the steps of setting a collection period comprised of a plurality of days, dividing each day of the collection period into a number of time segments, and allocating a memory area to each time segment. User data is saved during the collection period. The user data is comprised of events caused by user activity or non-events indicating a lack of user activity. User data is saved in the memory area for the time segment in which it occurs. Patterns of user behavior are determined by analyzing the memory areas for the time segments that comprise the collection period and corresponding user data associated with each time segment. The time shift buffer of the recording device is operated in accordance with the determined patterns of user behavior.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the Examples included therein and to the Figures and their previous and following description.

Figure 1:
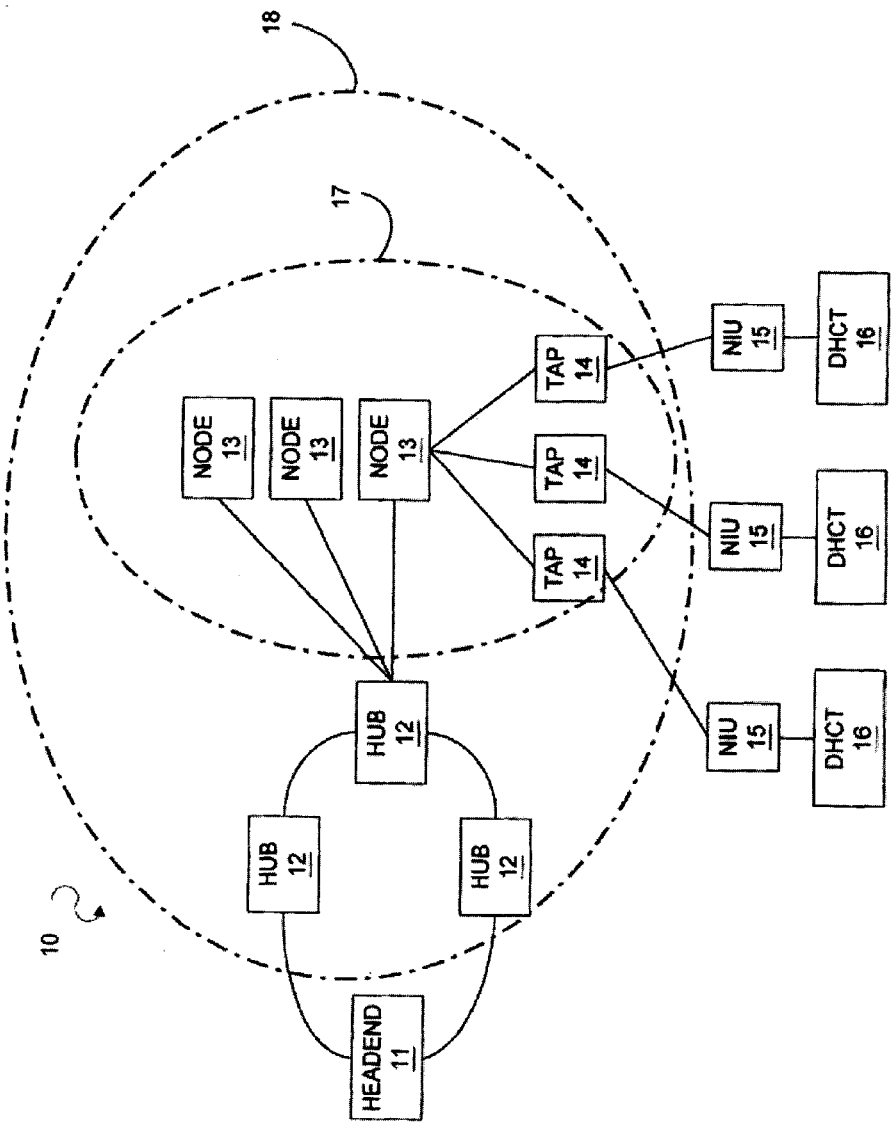
FIG. 1 is a block diagram of an example subscriber television system in accordance with one embodiment of the invention.

One embodiment of the present invention is generally implemented as part of a subscriber television system (STS), which includes, for example, digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1 shows a block diagram view of a STS 10, which is generally a high quality, reliable and integrated network system that is typically capable of delivering video, audio, voice and data services to digital home communication terminals (DHCTs) 16. Although FIG. 1 depicts a high level view of a STS 10, it should be appreciated that a plurality of subscriber television systems can tie together a plurality of regional networks into an integrated global network so that DHCT users can receive media content provided from anywhere in the world.

Further, it will be appreciated that the STS 10 shown in FIG. 1 is merely illustrative and should not be construed as implying any limitations upon the scope of the preferred embodiments of the present invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, HFC, optical, satellite, RF, FM, and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1, a typical STS 10 comprises a headend 11, hubs 12, an HFC access network 17, and DHCTs 16. It should be appreciated that although a single component (e.g. a headend) is illustrated in FIG. 1, a STS 10 can feature a plurality of any one of the illustrated components or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which, in one embodiment, is connected to a network interface unit (NIU) 15 which is connected to a digital home communication terminal (DHCT) 16. In other embodiments, the tap 14 is connected directly to a digital home communication terminal (DHCT) 16. The NIU 15, when implemented, is normally located at the property of a subscriber and provides a transparent interface between the HFC node 13 and the user property internal wiring. Coaxial cables are typically used to couple nodes 13, taps 14 and NIUs 15 because the electrical signals can be easily repeated with radio frequency (RF) amplifiers.

As the high-level operations of many of the functions of a STS 10 are well known to those of ordinary skill in the art, further high level description of the overall STS 10 of FIG. 1 will not be contained herein.

Figure 2:
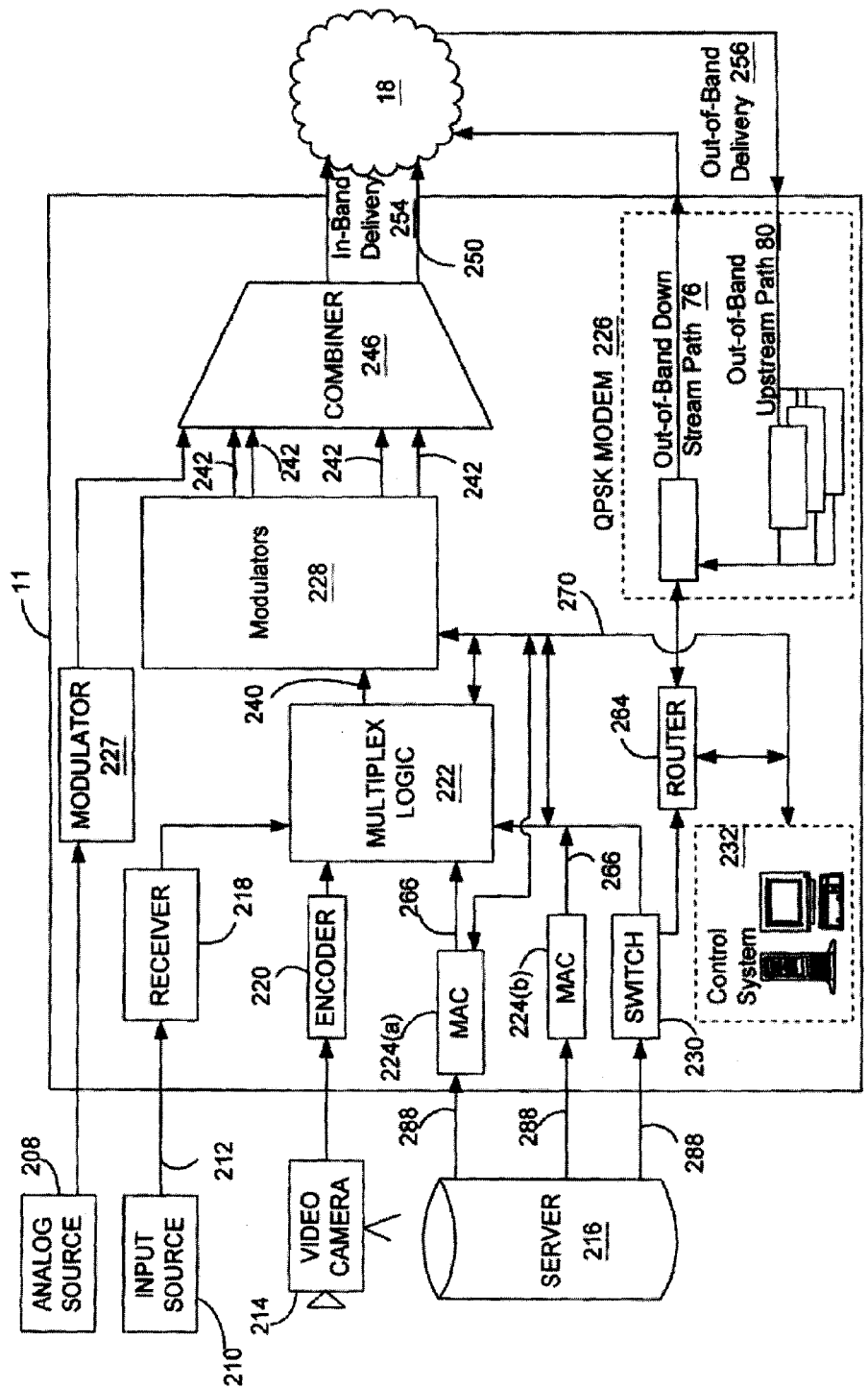
FIG. 2 is a block diagram of an example headend as depicted in FIG. 1 and related equipment, in accordance with one embodiment of the invention.

FIG. 2 is an overview of a headend 11, which provides the interface between the STS 10 (FIG. 1) and the service and content providers. The overview of FIG. 2 is equally applicable to a hub 12, and the same elements and principles may be implemented at a hub 12 instead of the headend 11 as described herein. It will be understood that the headend 11 shown in FIG. 2 is merely illustrative and should not be construed as implying any limitations upon the scope of the preferred embodiments of the invention. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend 11 as would be appreciated by one having ordinary skill in the art. The signals provided by the content or programming input sources can include a single media content instance (i.e. individual instances of media content such as an episode of a television show, a movie, or a web-page, etc.) or a multiplex that includes several media content instances.

The headend 11 generally includes one or more receivers 218 that are each associated with a content source. MPEG encoders, such as encoder 220, are included for digitally encoding at least some local programming or a real-time feed from video camera 214, or the like. The encoder 220 outputs the respective compressed video and audio streams corresponding to the analog audio/video signal received at its input. For example, encoder 220 can output formatted MPEG-4 (typically carried over an MPEG-2 compliant transport stream), MPEG-2 or MPEG-1 packetized elementary (PES) streams or transport streams compliant to the syntax and semantics of the ISO MPEG-2 standard, respectively. The PES or transport streams may be multiplexed with input signals from switch 230, receiver 218 and control system 232. The multiplexing logic 222 processes the input signals and multiplexes at least a portion of the input signals into transport stream 240. Analog input source 208 can provide an analog audio/video broadcast signal which can be input into modulator 227. From modulator 227, a modulated analog output signal can be combined at combiner 246 along with other modulated signals for transmission into transmission medium 250. Alternatively, analog audio/video broadcast signal from analog input source 208 can be input into modulator 228. Alternatively, analog audio/video broadcast signal can be input directly from modulator 227 to transmission medium 250. The analog broadcast media content instances are transmitted via respective radio-frequency (RF) channels, each assigned for transmission of an analog audio/video signal such as NTSC video.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may also be located within the headend 11 or elsewhere within the STS 10, such as in a hub 12. The various inputs into the headend 11 are then combined with the other information from the control system 232, which is specific to the STS 10, such as local programming and control information, which can include among other things conditional access information. The headend 11 contains one or more modulators 228 to convert the received transport streams 240 into modulated output signals suitable for transmission over the transmission medium 250 through the network 18. In one example, the network can be an IP network. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include, for example, DTS and ATS. In one embodiment, the server 216 also provides various types of data 288 to the headend 11. The data, in part, is received by the media access control functions 224, that output MPEG transport packets containing data 266 instead of digital audio/video MPEG streams. The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport stream 242, system specific MPEG table packet organization, and/or conditional access information. Control information and other data can be communicated to hubs 12 and DHCTs 16 via an in-band delivery path 254 or via an out-of-band delivery path 256.

Also shown in FIG. 2 are Out-Of-Band (OOB) signals that provide continuously available two-way signaling to the subscribers' DHCT 16 regardless of which in-band signals are tuned to by the individual DHCT in-band tuners, as described below. The OOB signals consist of a Forward Data Signal (FDS) 76 and a Reverse Data Signal (RDS) 80. The OOB signals can comply to any one of a number of well known transport protocols but preferably comply to either a DAVIC 1.1 Transport Protocol with FDS of 1.544 mega-bits per second (Mbps) or more using quadrature phase shift keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

The out-of-band data is transmitted via the out-of-band FDS 76 of transmission medium 250 by means such as, but not limited to, a Quadrature Phase-Shift Keying (QPSK) modem array 226. Two-way communication utilizes the RDS 80 (FIG. 1B) of the out-of-band delivery path 256. Hubs 12 and DHCTs 16 transmit out-of-band data through the transmission medium 250, and the out-of-band data is received in headend 11 via out-of-band RDS 80. The out-of-band data is routed through router 264 to an application server 216 or to control system 232. The out-of-band control information includes such information as a pay-per-view purchase instruction and a pause viewing command from the subscriber location to a video-on-demand type application server located internally or external to the headend 11, such as application server 216, as well as any other data sent from the DHCT 16 (FIG. 1) or hubs 12, all of which will preferably be properly timed. The control system 232 also monitors, controls, and coordinates all communications in the subscriber television system, including video, audio, and data. The control system 232 can be located at the headend 11 or remotely.

The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and hybrid fiber-coax (HFC), satellite, direct broadcast, or other transmission media.

Figure 3A:
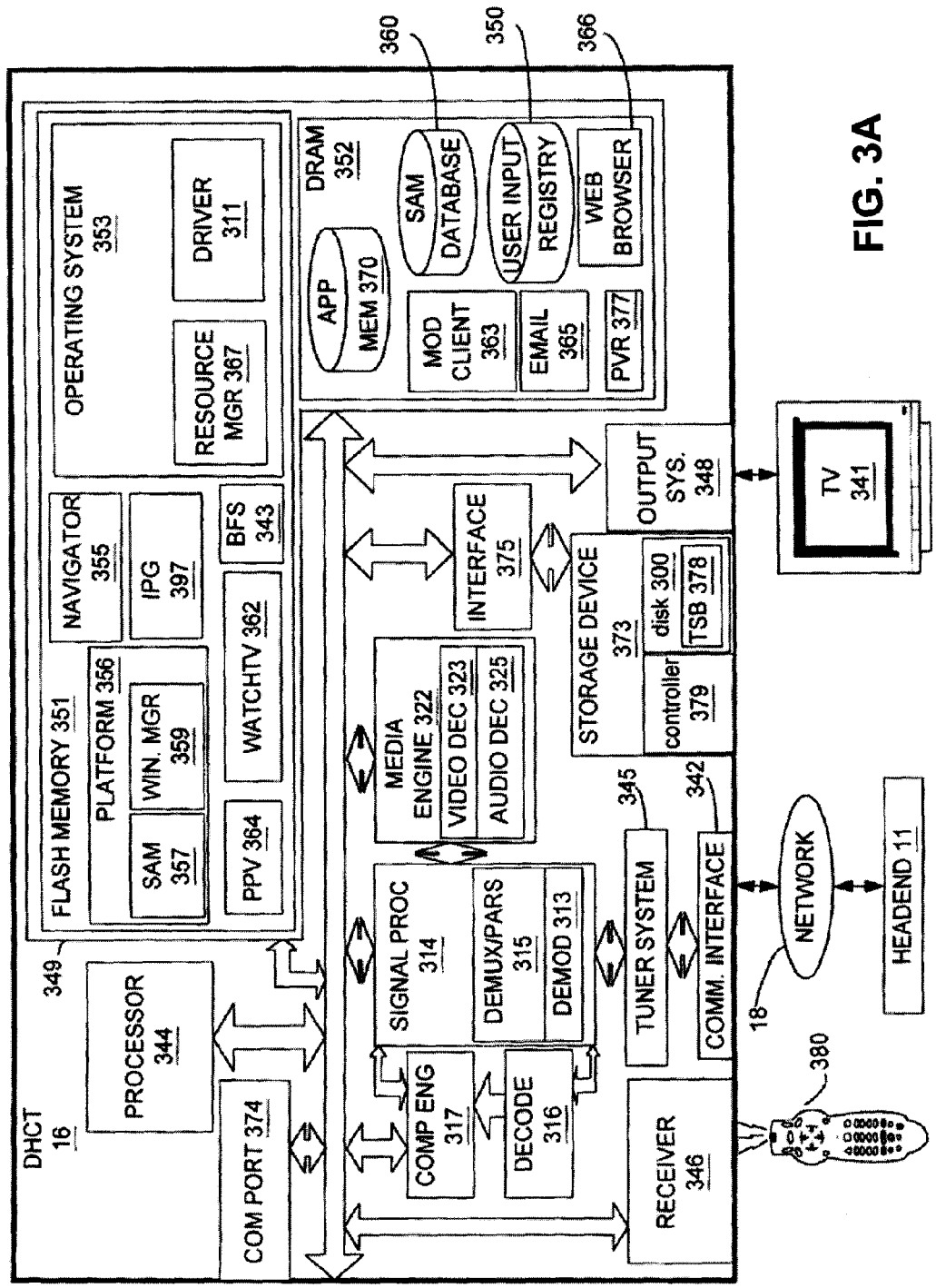
FIG. 3A is a block diagram of an example DHCT as depicted in FIG. 1 and related equipment, in accordance with one embodiment of the invention.

FIG. 3A is a block diagram illustration of an example DHCT 16 that is coupled to a headend 11 and to a television, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as the MOD client application 363) may instead be performed at the headend 11 and vice versa, or not at all in some embodiments. A DHCT 16 is typically situated at the residence or place of business of a user and may be a stand-alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes at least one processor 344 for controlling operations of the DHCT 16, an output system 348 for driving the television display 341, and at least one tuner system 345 for tuning into a particular television channel or frequency to be displayed and for sending and receiving various types of data or media content to and from the headend 11. The DHCT 16 may include, in other embodiments, multiple tuners for receiving downloaded (or transmitted) media content. Tuner system 345 can select from a plurality of transmission signals (FIG. 1) provided by the subscriber television system. Tuner system 345 enables the DHCT 16 to tune to downstream media and data transmissions, thereby allowing a user to receive digital or analog media content delivered in the downstream transmission via the subscriber television system. The tuner system 345 includes, in one implementation, an out-of-band tuner for bi-directional quadrature phase shift keying (QPSK) data communication and a quadrature amplitude modulation (QAM) tuner (in band) for receiving television signals. Additionally, a receiver 346 receives externally generated information, such as user inputs or commands from an input device, such as remote control device 380, or other devices. According to another embodiment of the invention, a telephone modem (not shown) in the DHCT 16 can be utilized for upstream data transmission and a headend 11, hub 12 (FIG. 1) or other component located upstream in the STS 10 can receive data from a telephone network corresponding with the telephone modem and can route the upstream data to a destination internal or external to the STS 10, such as an application data server in the headend 11 or content provider. In other aspects, an IP signaling path can be used utilizing, for example, DOCSIS, or some other method.

The DHCT 16 includes signal processing system 314, which comprises demodulating system 313 and transport demultiplexing and parsing system 315 (herein demultiplexing system) to process broadcast media content and/or data. One or more of the systems of signal processing system 314 can be implemented with software, a combination of software and hardware, or preferably in hardware. Demodulating system 313 comprises functionality for RF signal demodulation, either an analog transmission signal or a digital transmission signal. For instance, demodulating system 313 can demodulate a digital transmission signal in a carrier frequency that was modulated, among others, as a QAM-modulated signal. When tuned to a carrier frequency corresponding to an analog TV signal transmission, demultiplexing system 315 is bypassed and the demodulated analog TV signal that is output by demodulating system 313 is instead routed to analog video decoder 316. Analog video decoder 316 converts the analog video signal (i.e. the video portion of a media content instance that comprises a video portion and an audio portion) received at its input into a respective non-compressed digital representation comprising a sequence of digitized pictures and their respective digitized audio. Presented at the input to analog video decoder 316 is an analog video signal such as NTSC video comprising of audio and video.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656, for display on TV 341. Compression engine 317 is coupled to localized memory 349, preferably DRAM 352, for input and processing of the input digitized pictures and their respective digitized audio. Alternatively, compression engine 317 can have its own integrated memory (not shown). Compression engine 317 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO standard, so that they can be interpreted by video decoder 323 and audio decoder 325 for decompression and reconstruction at a future time. Each compressed stream consists of a sequence of data packets containing a header and a payload. Each header contains a unique program identification, or PID, associated with the respective compressed stream.

Compression engine 317 multiplexes the audio and video compressed streams into a transport stream, such as an MPEG-2 transport stream, for output. Furthermore, compression engine 317 can preferably compress audio and video corresponding to more than one program in parallel (e.g., two tuned analog TV signals) and to multiplex the respective audio and video compressed streams into a single transport stream. Output of compressed streams and/or transport streams produced by compression engine 317 is input to signal processing system 314. Parsing capabilities 315 within signal processing 314 allow for interpretation of sequence and picture headers, for instance, annotating their locations within their respective compressed stream for future retrieval from storage device 373. A compressed analog media content instance (e.g., TV program episode, or show) corresponding to a tuned analog transmission channel can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 for its display on TV 341.

Demultiplexing system 315 can include MPEG-2 transport demultiplexing. When tuned to carrier frequencies carrying a digital transmission signal, demultiplexing system 315 enables the separation of packets of data, corresponding to the compressed streams of information belonging to the desired media content instances, for further processing. Concurrently, demultiplexing system 315 precludes packets in the multiplexed transport stream that are irrelevant or not desired, such as packets of data corresponding to compressed streams of media content instances of other media content signal sources (e.g. other TV channels), from further processing.

One having ordinary skill in the art will appreciate that signal processing system 314 will preferably include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention, including analog signals (e.g. NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or subcomponents thereof. Further, it will be understood by those having ordinary skill in the art that components of signal processing system 314 can be spatially located in different areas of the DHCT 16. Further, it will be understood by those having ordinary skill in the art that, although the components of signal processing system 314 are illustrated as being in communication with an incoming signal from the communications interface 342, the signal may not necessarily be in the order shown for all signals.

The DHCT 16 also includes media engine 322, which includes digital video decoder 323 also known as video decompression engine, and digital audio decoder 325 also known as audio decompression engine, and other digital signal processing components not shown, as would be appreciated by those having ordinary skill in the art. For example, demultiplexing system 315 is in communication with tuner system 345, and processor 344 to effect reception of digital compressed video streams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, demultiplexing system 315 demultiplexes and separates desired compressed streams from the received transport stream without disturbing its content. Further, parser 315 parses (i.e., reads and interprets) compressed streams such as to interpret sequence headers and picture headers, and deposits a transport stream carrying compressed streams of a first media content instance into DRAM 352. Processor 344 causes transport stream in DRAM 352 to be transferred to the storage device 373 via interface 375. Under program control by processor 344, the demultiplexing system 315 in communication with the digital video decoder 323, storage device 373, and processor 344 effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, media engine 322 can have access to a dedicated localized DRAM (not shown). Upon demultiplexing and parsing the transport stream carrying one or more media content instances, signal processing system 314 outputs to DRAM 352 ancillary data in the form of a table or data structure (not shown) comprising the relative or absolute location of the beginning of certain pictures in the compressed media content instance for convenience in retrieval during future operations.

In another embodiment, according to a plurality of tuners, and respective number of demodulating systems 313, demultiplexing systems 315, and signal processing systems 314, a respective number of broadcast digital media content instances are received and routed to the hard disk 300 of storage device 373 simultaneously. Alternatively, a single demodulating system 313, a single demultiplexing system 315, and a single signal processing system 314, each with sufficient processing capabilities can serve to process more than one digital media content instance.

In one implementation, compression engine 317 can output formatted MPEG-2 or MPEG-1 packetized elementary streams (PES) inside a transport stream, all compliant to the syntax and semantics of the ISO MPEG-2 standard. Alternatively, compression engine 317 can output other digital formats that are compliant to other standards. The digital compressed streams output by compression engine 317 corresponding to a media content instance are deposited in local memory for compression engine 317 and routed to demultiplexing system 315. Demultiplexing system 315 parses (i.e., reads and interprets) the transport stream generated by compression engine 317 without disturbing its content, such as to interpret picture headers, and deposits the transport stream into DRAM 352. Processor 344 causes transport stream in DRAM 352 to be transferred to the storage device 373. While parsing the transport stream, demultiplexing system 315 outputs to memory 352 ancillary data in the form of a table or data structure (not shown) comprising the relative or absolute location of the beginning of certain pictures in the compressed media content stream for the media content instance for convenience in retrieval during future operations. In this way, random access operations such as fast forward, rewind, and jumping to a location in the compressed media content instance can be attained.

In another embodiment, according to a plurality of tuners, a respective number of analog video decoders 316, and a respective number of compression engines 317, the aforementioned compression of analog video and audio is performed and routed to hard disk 300 of the storage device 373 simultaneously for a respective number of analog media content instances. Alternatively, a single compression engine with sufficient processing capabilities can serve to compress more than one analog media content instance.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), Internet, serial, and/or parallel ports. The user inputs may be, for example, provided by an input device including a computer or transmitter with buttons or keys located either on the exterior of the terminal or by a hand-held remote control device 380 or keyboard that includes user-actuated buttons, or even aural input.

Figure 3B:
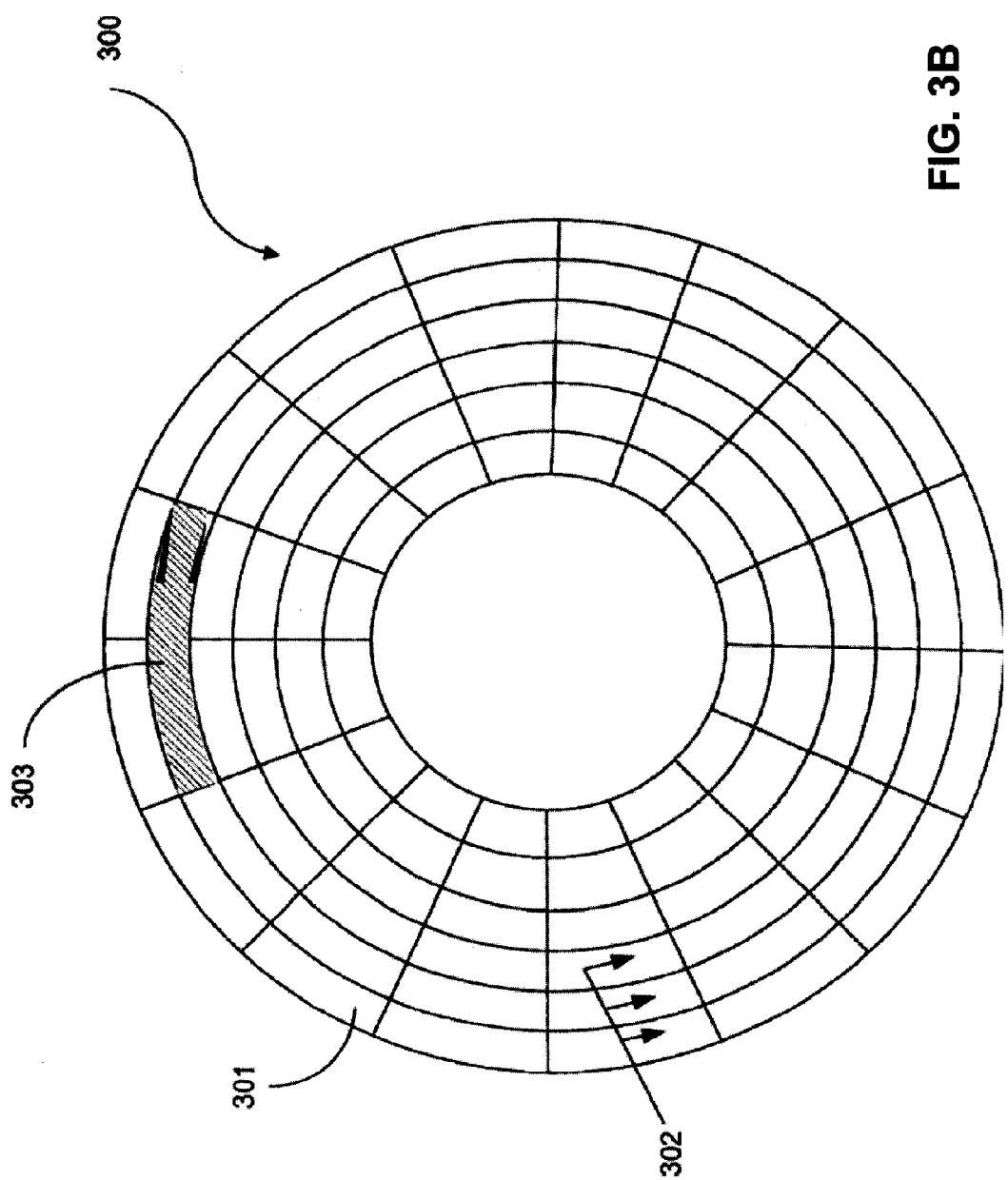
FIG. 3B is a block diagram of an example hard disk and hard disk elements located within the storage device coupled to the DHCT depicted in FIG. 3A.

The DHCT 16 includes at least one storage device 373 to provide storage for downloaded media content. Storage device 373 can be an optical storage device or a magnetic storage device, among others, and is preferably a hard disk drive. Storage device 373 comprises storage for media content and/or data that can be written to for storage and later read from for retrieval for presentation. The storage device 373 preferably includes at least one hard disk 300. Throughout this disclosure, references relating to writing to or reading from the storage device 373, or references regarding recordings from or to the storage device 373 will be understood to mean that such read or write operations are occurring to the actual medium (for example, the hard disk 300) of the storage device 373. Preferably located in each hard disk 300 is one or more time shift buffers (TSBs) 378, which comprise a plurality of clusters (as described below) for temporarily receiving media content and/or data. The storage device 373 is also comprised of a controller 379 that receives operating instructions from the device driver 311 of the operating system 353 (as described below) and implements those instructions to cause read and/or write operations to the hard disk 300. The device driver 311 communicates with the storage device controller 379 to format the hard disk 300, causing the hard disk to be divided radially into sectors 301 and concentric circles called tracks 302, as illustrated by the block diagram illustration of the example hard disk 300 in FIG. 3B. Note from FIG. 3B that the same number of sectors 301 per track 302 are illustrated, but other embodiments with a different number of tracks per side, sectors per track, bytes per sector, and in different zones of tracks, are within the scope of the preferred embodiments of the invention. The sector 301 is the basic unit of storage on the hard disk 300. In one implementation, each sector 301 of a hard disk 300 can store 512 bytes of user data. While data is stored in 512-byte sectors on the hard disk 300, the cluster, such as example cluster 303, is typically the minimum unit of data storage the operating system 353 uses to store information. Two or more sectors on a single track make up a cluster.

Referring again to FIG. 3A, storage device 373 is preferably internal to DHCT 16, coupled to a common bus through a communication interface 375, preferably an integrated drive electronics (IDE) or small computer system interface (SCSI), although IEEE-1394 or USB, among others, can be used. In other embodiments, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 (as described below) and executed by processor 344, and in coordination with the personal video recording (PVR) application client 377 and the device driver 311 (the latter two components described below), downloaded media content (herein understood to also refer to other types of data, in addition to, or instead of, media content instances) are received in DHCT 16 via communications interface 342 and stored in a temporary cache (not shown) in memory 349. The temporary cache is implemented and managed to enable media content transfers from the temporary cache to storage device 373, or, in concert with the insertion of a newly arriving media content into the temporary cache. In one implementation, the fast access time and high data transfer rate characteristics of the storage device 373 enables media content to be read from the temporary cache in memory 349 and written to storage device 373 in a sufficiently fast manner. Orchestration of multiple simultaneous data transfer operations is effected so that while media content is being transferred from the cache in memory 349 to storage device 373, new media content is received and stored in the temporary cache of memory 349. In other implementations, the downloaded media content is received through communications port 374 in the DHCT 16 and then transferred directly to storage device 373, thus bypassing the temporary cache.

Processor 344 in communication generally with device driver 311 and storage device controller 379 and demultiplexing system 315 effect retrieval of compressed video streams, compressed audio streams, and data streams corresponding to one or more media content instances from storage device 373. Retrieved streams are deposited in an output cache in storage device 373 and transferred to memory 352, and then processed for playback according to mechanisms that would be understood by those having ordinary skill in the art. In some embodiments, the media content instances are retrieved and routed from the hard disk 300 to the video and audio decoding system simultaneously, and then further processed for eventual presentation on a display device or other device.

In one implementation, the DHCT 16 includes system memory 349, which includes FLASH memory 351 and dynamic random access memory (DRAM) 352, for storing various applications, modules and data for execution and use by the processor 344. Basic functionality of the DHCT 16 is provided by an operating system 353 that is primarily stored in FLASH memory 351. The operating system 353 includes, among other elements, at least one resource manager 367 that provides an interface to resources of the DHCT 16 such as, for example, computing resources. Also included within operating system 353 is one or more device drivers that provides operating instructions to an internal or external storage device, such as storage device 373, and other peripheral devices not shown. In one implementation, device driver 311 provides operating instructions to the storage device controller 379 of the storage device 373 to effect, among other functions, read and/or write operations to the hard disk 300 of the storage device 373. The device driver 311 includes several driver modules, including MPEG transport 361, audio/video (A/V) File System Manager 368, and DVR Manager 369. MPEG transport 361 provides functionality for decoding (i.e. providing operating instructions to the media engine 322 for MPEG A/V decoding) and playing A/V encoded in MPEG transport streams. A/V File System Manager 368, under control of the DVR Manager 369, enables MPEG transport 361 to effect the decoding and playback functionality by effecting retrieval of MPEG A/V media content from the storage device 373 and providing the content to the audio decoder 325 and video decoder 323 of media engine 322. AV File System Manager 368 also provides functionality for the recording of MPEG streams. The AV File System Manager 368 manages data about each recorded media content instance including where it is stored physically (i.e. cluster management, as described below) and the locations of I-Frames (a series of "still pictures" of an MPEG transport stream that the DHCT 16 can use to provide a display during rewind or fast forward operations).

The AV File System Manager 368 also provides a software generated pointer, called Normal Play Time (NPT), which points to locations within files and locations within media content instances within those files. Based on the Lightweight Stream Control Protocol, NPT can be thought of as the clock associated with a video asset (as distinguished from real-time clock (not shown) for the DHCT 16). For every file that is created for media content downloaded to the storage device 373, an NPT is generated. There is an NPT for the read head of the storage device 373 and for the write head of the storage device 373. For writing content to the storage device 373 for a newly created file (e.g. a TSB file), an NPT is created for the write head of the storage device 373 with an initial value of zero. In one implementation, the AV File System Manager 368 receives a periodic interrupt (for example every 510 msec) set up by the PVR application 377 through the computer services of the operating system 353. This interrupt is synchronized with the internal real-time clock (not shown) of the DHCT 16 in order to advance the pointer (i.e. the NPT) at a substantially constant rate. The NPT continues to increase in value (from an initial value of zero) until the associated file is closed. For the read head of the storage device 373, the NPT starts at 0 at the start of the file, advances in real time in normal play mode, advances faster than real time in fast forward mode, decrements in rewind mode, and is fixed when the video is paused. The DVR Manager 369 is the driver module that controls the operation of the MPEG encoding and MPEG decoding (through MPEG transport 361), and uses the services of the AV File System Manager 368 to store and provide functionality for the playback of files. It will be understood that references to the device driver 311 will include one or more, or a combination of one or more of the aforementioned device driver modules.

One or more programmed software applications, herein referred to as applications, are executed by utilizing the computing resources in the DHCT 16. The applications, or application clients, may be resident in FLASH memory 351 or downloaded (or uploaded) into DRAM 352. Applications stored in FLASH memory 351 or DRAM 352 are executed by processor 344 (e.g., a central processing unit or digital signal processor) under the auspices of the operating system 353. Data required as input by an application is stored in DRAM 352 or FLASH memory 351 and read by processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by processor 344 during the course of application execution. DRAM 352 also includes application memory 370 that various applications may use for storing and/or retrieving data.

An application referred to as navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu.

The FLASH memory 351 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and deallocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e. structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As an example, a service of presenting a television program (media content instance) could be executed by the WatchTV application 362 with a set of parameters specifying those needed to view HBO or with a separate set of parameters to view CNN. Each association of the application component (tune video) and one parameter component (HBO or CNN) represents a particular service that has a unique service I.D. The SAM client 357 also interfaces with the resource manager 367, as discussed below, to control resources of the DHCT 16.

Application clients can also be downloaded into DRAM 352 at the request of the SAM client 357, typically in response to a request by the user or in response to a message from the headend 11. In the example DHCT 16 illustrated in FIG. 3A, DRAM 352 includes a media-on-demand application (MOD) 363, an e-mail application 365, PVR application 377, and a web browser application 366. It should be clear to one with ordinary skill in the art that these applications are not limiting and merely serve as examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client, or application, is designed to not have access to certain user input keys reserved by the navigator (i.e., power, channel+/−, volume+/−, etc.).

The MOD client application 363 provides the user with lists of available media content titles for each media content instance to choose from and with media content instances requested by the user. The MOD client application 363 provides media content to the user by engaging, typically, in a direct two-way IP (Internet Protocol) connection with VOD content servers (not shown) that would be located, in one embodiment, in the headend 11 (FIG. 2).

An executable program or algorithm corresponding to an operating system (OS) component, or to a client platform component, or to an application client, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application client, or to respective parts thereof, can reside in FLASH memory 351, or in a local storage device (such as storage device 373) externally connected to or integrated into DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

Permanent recordings and other write operations of media content to the storage device 373 are primarily effected by a PVR architecture comprising the PVR application 377 and the device driver 311. At one level of abstraction, the PVR application 377 provides high-level control for writing of digital data from multiple input streams to the storage device 373 for both scheduled permanent recordings and permanent recordings from a time shift buffer (TSB) 378, or writes to the TSB 378. The TSB 378 is a configurable allocation of hard disk clusters that store the data downloaded from the data streams. More than one TSB 378 may be used, for instance, one TSB per tuner in the case of a DHCT 16 with multiple tuners. Through mechanisms explained below, media content received into the TSB 378 will have a temporary recording designation. That is, media content stored in clusters of the TSB 378 will have a temporary residence. This receiving of media content into the TSB 378 for temporary residence will also be referred to as buffering. The media content stored in the TSB 378 will either be deleted (i.e. the clusters storing the media content will be configured as writeable for eventual write operations that overwrite the media content within those clusters) or retained (through election by the user) as a permanent recording. A permanent recording will be understood to mean media content that is stored for an extended period of time as decided by the user. Permanent recordings are stored in non-buffer clusters (i.e. not in clusters of the TSB 378) that are not used for the TSB 378 in instances when the user elects in advance to make a scheduled recording of a media content instance that has not yet been tuned to at the DHCT 16. A permanent recording can also be achieved by selecting a media content instance stored in the TSB 378 and designating the media content instance as permanent. Further, when the media content instance is designated as permanent, the associated TSB clusters are configured for eventual designation as non-buffer clusters (i.e. permanent recording clusters). Thus, permanent recordings will preferably be more permanent than media content in the TSB 378, and permanent recordings can eventually be deleted from the disk space, typically at the explicit request of a user, as one example. This deletion occurs, in one implementation, by configuring the associated non-buffer clusters as writeable, and thus eventually available for the TSB 378 or scheduled recordings. As part of the high level control provided by the PVR application 377, the PVR application 377 also provides media content instance data management and user interfaces. With respect to media content instance data management, the PVR application 377 maintains the media content instance guide data on the hard disk 300 for all permanently recorded files and TSB 378 files with their associated media content.

Hard disk drives have a finite life, and when used in a high stress application such as a DHCT, placing the disk into an idle state whenever possible helps prolong the life of the unit. However, placing the disk into an idle state may produce results contrary to customer's expectations since they generally expect a settop box to be always on and ready for use.

One of the attractive features of a DHCT 16 is the ability to pause live TV and even rewind to replay something that was on earlier. As described above, this functionality is provided by the TSB 378. The TSB 378 normally keeps some amount of video available for review at all times. Having this available at all times requires that the hard drive always be active, which can cause undue wear and power consumption.

People are generally creatures of habit. They tend to perform the same basic routines, typically on a daily or weekly schedule. These habits are further reinforced by the fact that most television channels have regular schedules, and people tend to have favorite shows. By monitoring viewing habits, reasonable estimations can be made as to when a user is not watching television such that it is permissible to disable the TSB 378, and when the viewer is most likely to be watching television. This can be accomplished in one aspect by establishing a collection period comprised of a plurality of days and dividing each day (i.e., 24-hour period) of the collection period into a number of time segments. For example, a 24-hour period can be divided into 15 minute increments, 30-minute increments, one-hour increments, etc. For each time segment a memory storage location or bin is allocated. For instance, memory can be allocated in the DRAM 352 for this purpose. Enough of these memory storage locations should be allocated to store multiple days of data, for instance, several weeks worth of data. Each time a key press is detected from an input device associated with the DHCT 16, such as remote control device 380, or other devices, the memory storage location corresponding to the current time is marked as active. In this way a history is created of times that the user interacts with the settop. In one aspect, the actual channel, key press, and/or program viewed would also be recorded as provided by the user input registry 350 and/or the navigator 355. The above describes just one method of determining viewer usage patterns. It is to be appreciated that other methods are contemplated within the scope of this invention.

The memory storage locations for a collection period or a portion of a collection period (e.g., days, week, or weeks) that have passed can be examined to make a reasonable prediction as to what the patterns of user behavior will be for time periods in the future. If the memory storage location for a particular time segment is marked as used in a previous corresponding time period, there is a greater probability that it will happen again for the same time period in the future, based on predictive human behavior. This projected activity can then be used to decide when to enable or disable the TSB 378. Based on available guide data and historical data on the channel watched, it is possible to tell when a program both starts and end. The TSB 378 can be disabled until just before the start of the program. The DHCT 16 could also be programmed to tune to the right program and start the TSB recording at the start of the anticipated show.

One issue that can arise is that the predictive nature of the methods disclosed herein could prevent or reduce the user from making a key press which would cause any key press history from being recorded. However, one of the aims of this invention is to make sure the TSB 378 is ready when the user wants it. If the user never engages the TSB 378 with one of the trick mode keys (pause, rewind, fast forward, etc.) then there is no issue. In another scenario, the DHCT 16 may be in an "off" or "sleep" state, and the user would turn it on in order to view a show. Alternatively a screen saver/blanker could be displayed after long periods of inactivity, perhaps coincident with idling the disk drive. A key press to disable the blanker would serve as an activity trigger.

If the DHCT 16 automatically is turned "off" while idle, the user can press the power key (either on the DHCT or on the remote 380) to activate the unit, which results in some activity. Alternatively, circuitry could be utilized to detect any type of remote control 380 activity (such as a TV volume command, etc) that would signal the presence of a user controlling the monitor device. If the unit is always on, other variations are possible, including noting that the TSB is being utilized via the trick mode (e.g., pause, rewind, fast forward, slow motion, etc.) commands. While this strategy generally works well for short attention span programs typical of the prime time lineup, other shows are not quite so predictable and knowing when to turn the TSB 378 off can be more challenging. For example, movies and sports events fall into this category. For the duration of these types of events, the user can go for long periods with utilizing the remote control 380. In order to prevent prematurely shutting the TSB 378 down during these events, SAM client data may be consulted to determine the ending time of the event. Some fixed margin may be added, and then if no activity occurs within that time the TSB 378 may be safely disabled.

By looking at the data from one or more prior collection periods it is possible to predict the likelihood of activity for the same periods in the future. In one non-limiting example, each time segment is 15 minutes, which results in 4*24*7 time segments for a week.

It is common practice for the user to periodically initiate some action via the remote control while the user is actively watching TV. Such actions can be comprised of, for example, switching channels, displaying program guide information, or other activities that the DHCT may perform. After a prolonged period of inactivity it is reasonable to assume that the user is no longer actively engaged nor likely to interact with the settop, and putting the hard disk drive into a sleep state will not be immediately noticed. However, the user will return to watching TV, and may immediately expect DVR services such as rewinding the current channel. If the hard disk has been idled, this operation can fail leading to an unsatisfactory experience for the user. However, if usage patterns are collected and used to predictively spin up the hard drive and enable the TSB in anticipation of the user's TV viewing patterns, the experience can be enhanced.

As described above, the navigator 355 gathers information based on remote control key presses. By tracking this information over a period of time the user's typical usage pattern will be recorded in memory storage locations corresponding to time segments and then used to spin the hard disk up prior to the expected access time, thus making the DHCT fully functional when the user needs it. In one aspect, the information can be periodically stored to non volatile memory such as the hard disk drive, thus preventing the loss of data should the unit be reset. Because people are generally habitual in their nature and typically go through roughly the same routine on a daily or weekly basis, by collecting data over a period of several collection periods (e.g., several weeks), reasonable predictions can be made as to the behavior expected in the future.

The algorithm comprises dividing the collection period into time segments (e.g., 15 minutes) each, and creating a bin for each segment to keep a record of remote control events. Whenever a remote control or front panel key is pressed, the corresponding bin is marked as used. By examining which bins have been marked, it can be roughly determined when throughout the day the user was actively engaged in watching TV. Knowing that many people are on a weekly schedule, it is reasonable to expect that by examining usage patterns for the prior weeks it is possible to predict when the user is most likely to request the DVR rewind services.

In one respect, the algorithm provides for the collection of data for at least one collection period (e.g., one week) before attempting predictive behavior. (During this time some reasonable default behavior would be used.) Once a collection period's worth of data has been collected, the algorithm would look back in the memory storage areas for corresponding time segments from the collection period. Assuming that the disk is idled at the beginning of a time segment that shows some form of user activity, to make sure the disk is ready when needed, a spin up window is defined. Since the TSB 378 is generally expected to hold 60 minutes worth of data the hard disk can be spun up 60 minute prior to the first expected key press. The algorithm determines which bin to examine. The correct bin would correspond to a time one collection period prior to the target ready time. For example, at 6:00 AM on a Tuesday, the memory storage area for 7:00 AM on one or more prior Tuesdays would be examined. If activity was recorded in the memory storage area for the time segment that included 7:00 a.m. on Tuesday of the collection period, then at approximately 6:00 a.m. on the present Tuesday the hard disk would be spun up in anticipation of user activity corresponding to activity that occurred in the collection period.

Once the disk is running, a spin down window is defined. For example, a typical spin down window might be to wait for 120 minutes past the last expected key press. To determine this window, the current time is checked and any memory storage areas from the prior collection period corresponding to the current time to a time 120 minutes into the future are examined. If any are non zero (i.e., activity occurred and was recorded), the disk remains running. The current program's running time (as found in guide data related to programming) can be used to modify the correct spin down time so that the disk does not spin down during the viewing of a movie, sporting event, or other similar extended programming. The decision logic would operate like the spin up logic.

Figure 4:
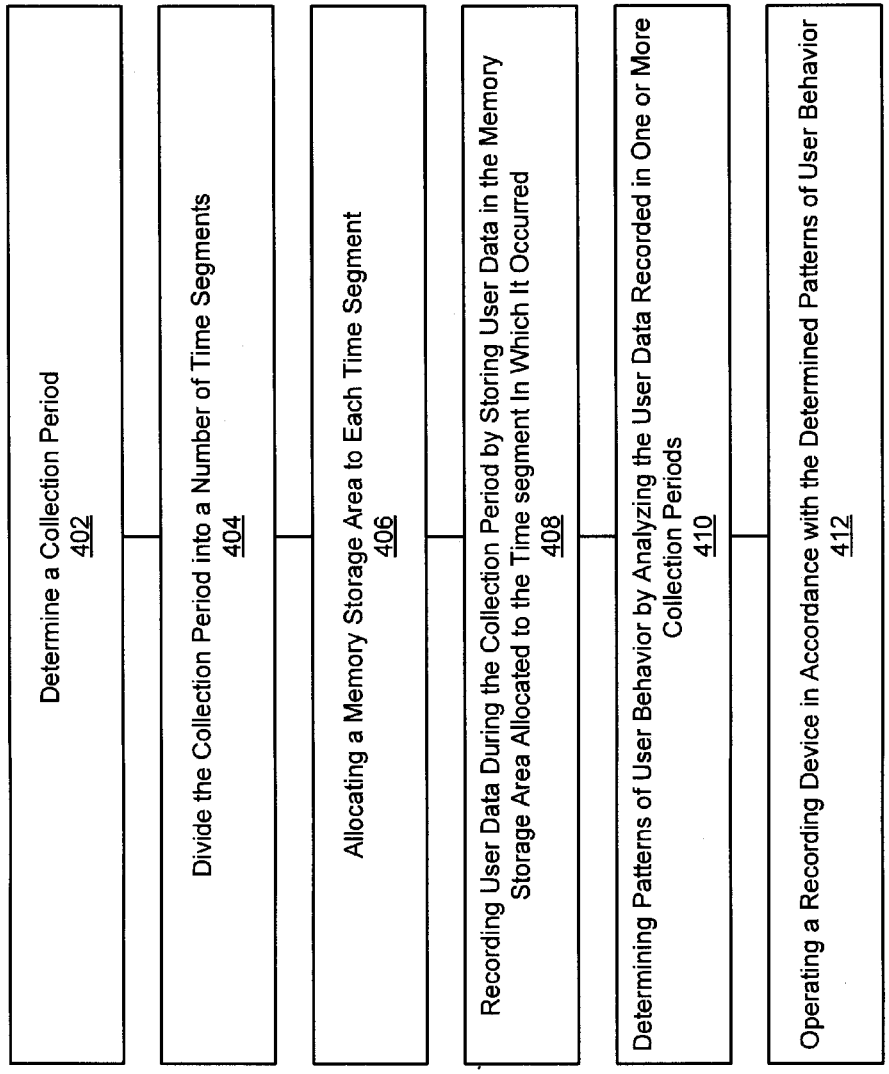
FIG. 4 is an exemplary flowchart illustrating a process for predictive management of a recording device such as a DHCT.

FIG. 4 is an exemplary flowchart illustrating a process for predictive management of a recording device such as a DHCT. At step 402, a collection period is established. Generally, the collection period comprises a plurality of days, such as one week, though other collection periods are contemplated within the scope of the invention. At step 404, the collection period is divided into a number of time segments. For example, the collection period can be divided into one-hour increments, 30-minute increments, 15-minute increments, etc. At step 406, a memory storage area is allocated to each time segment. For example, if there are 672 time segments in a collection period, then each of the 672 time segments are allocated a memory storage area. At step 408, user data is recorded in the memory storage area corresponding to the time segment in which a user activity occurred. User data can be comprised of user activity during a time period such as turning the recording device on or off, changing channels, rewinding, pausing, fast forwarding, etc. Further, user data can be comprised of the lack of any user activity during a time segment.

At step 410, patterns of user behavior are determined by analyzing the memory storage areas for the time segments that comprise one or more collection periods. This analysis can be used to predict future behavior of a user. Determining patterns of user behavior can include, for example, determining a time period to perform routine maintenance on the recording device through a subscriber television system based on the lack of user activity during one or more time segments of the collection period; determining whether a user rewinds, pauses or fast forwards while the recording device is receiving a particular television show or a particular type of television show; determining television shows or types of television shows that a user selects for watching through the recording device; among other things. Routine maintenance can include, for example, defragmenting the hard drive, searching the drive for bad blocks, reorganizing databases, etc.

At step 412, the recording device is operated in accordance with the patterns of user behavior. Operating the recording device in accordance with the patterns of user behavior can include, for example, placing the time shift buffer of the recording device in a rest state during periods of time in which the determined patterns of user behavior indicate the recording device is not in use; disabling the time shift buffer during periods of time in which the determined patterns of user behavior indicate a user does not rewind, pause or fast forward while viewing a television show; enabling the time shift buffer during periods of time in which the determined patterns of user behavior indicate a user rewinds, pauses or fast forwards while viewing a television show; enabling the time shift buffer for a particular television show or a particular type of television show when the determined patterns of user behavior indicate a user watches the particular television show or the particular type of television show; enabling the time shift buffer and storing information about a particular television show or a particular type of television show on the memory storage device when the determined patterns of user behavior indicate a user watches the particular television show or the particular type of television show, among other operations.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method of predictive management of a recording device comprising:
    setting a collection period comprised of a plurality of days;
    dividing each day of the collection period into a number of time segments;
    creating, on the recording device, a memory bin for each of the time segments, each memory bin being allocated to its corresponding time segment;
    saving user data during the collection period, wherein the user data is comprised of user activity or lack of activity during the plurality of days for the time segment in which it occurs and the user data is saved in the memory bin for the time segment in which it occurs;
    determining patterns of user behavior by analyzing memory bins for the time segments that comprise the collection period and corresponding user data associated with each time segment, wherein at least one time segment has an anticipated user activity; and
    operating the recording device in accordance with the determined patterns of user behavior, wherein the recording device is activated for a first predetermined time period prior to the anticipated user activity, the first predetermined time period prior to the anticipated user activity being at least equal to a time segment immediately preceding the at least one time segment having the anticipated user activity, and wherein the recording device is spun down after a second predetermined time past a last expected user activity when there was no anticipated user activity between a current time and the second predetermined time, wherein the second time predetermined time is automatically extended to equal a current program's running time, the current program's running time being estimated using program guide information and historical data for a television channel being received by the recording device, and wherein a greater number of days within a memory bin having user activity indicates a greater probability the patterns of user behavior predicts user activity.

2. The method of claim 1, wherein determining patterns of user behavior comprises determining a time period to perform routine maintenance on the recording device through a subscriber television system based on the lack of user activity during one or more time segments of the collection period.

3. The method of claim 1, wherein recording user data during the collection period comprises recording the television channel that is showing a television show being recorded by the recording device.

4. The method of claim 1, wherein recording user data during the collection period comprises recording whether a user rewinds, pauses or fast forwards while the recording device is receiving a television show.

5. The method of claim 1, wherein recording user data during the collection period comprises recording whether a user changes channels while the recording device is receiving a first television channel.

6. The method of claim 1, wherein determining patterns of user behavior by analyzing the memory bin for the time segments that comprise the collection period and corresponding user data associated with each time segment comprises determining whether a user rewinds, pauses or fast forwards while the recording device is receiving a particular television show or a particular type of television show.

7. The method of claim 1, wherein determining patterns of user behavior by analyzing the memory bin for the time segments that comprise the collection period and corresponding user data associated with each time segment comprises determining television shows or types of television shows that a user selects for watching through the recording device.

8. The method of claim 1, wherein determining patterns of user behavior by analyzing the memory bin for the time segments that comprise the collection period and corresponding user data associated with each time segment comprises determining time periods that a user watches television shows.

9. The method of claim 1, wherein determining patterns of user behavior by analyzing the memory bin for the time segments that comprise the collection period and corresponding user data associated with each time segment comprises analyzing the memory bin for the time segments that comprise a plurality of collection periods and corresponding user data associated with each time segment.

10. The method of claim 1, wherein the recording device is comprised of a time shift buffer.

11. The method of claim 10, wherein the time shift buffer is comprised of a hard disk drive.

12. The method of claim 10, wherein operating the recording device in accordance with the determined patterns of user behavior comprises placing the time shift buffer in a rest state during periods of time in which the determined patterns of user behavior indicate the recording device is not in use.

13. The method of claim 10, wherein operating the recording device in accordance with the determined patterns of user behavior comprises disabling the time shift buffer during periods of time in which the determined patterns of user behavior indicate a user does not rewind, pause or fast forward while viewing a television show.

14. The method of claim 10, wherein operating the recording device in accordance with the determined patterns of user behavior comprises enabling the time shift buffer during periods of time in which the determined patterns of user behavior indicate a user rewinds, pauses or fast forwards while viewing a television show.

15. The method of claim 10, wherein operating the recording device in accordance with the determined patterns of user behavior comprises enabling the time shift buffer for a particular television show or a particular type of television show when the determined patterns of user behavior indicate a user watches the particular television show or the particular type of television show.

16. The method of claim 10, wherein operating the recording device in accordance with the determined patterns of user behavior comprises enabling the time shift buffer and storing information about a particular television show or a particular type of television show on the memory storage device when the determined patterns of user behavior indicate a user watches the particular television show or the particular type of television show.

17. A recording device with predictive disk management comprising:
   a memory;
   a time shift buffer, wherein the time shift buffer is comprised of a hard disk drive; and
   a processor, wherein the processor is configured to execute executable code stored on the memory for performing the steps of,
   setting a collection period comprised of a plurality of days;
   dividing each day of the collection period into a number of time segments;
   creating, on the recording device, a memory bin for each of the time segments, each memory bin being allocated to its corresponding time segment;
   saving user data during the collection period, wherein the user data is comprised of user activity or lack of activity during the plurality of days for the time segment in which it occurs and the user data is saved in the memory bin area for the time segment in which it occurs;
   determining patterns of user behavior by analyzing memory bins for the time segments that comprise the collection period and corresponding user data associated with each time segment, wherein at least one time segment of the number of time segments has an anticipated user activity; and
   operating the time shift buffer of the recording device in accordance with the determined patterns of user behavior, wherein the time shift buffer is activated for a first predetermined time period prior to the anticipated user activity, the first predetermined time period prior to the anticipated user activity being at least equal to a time segment immediately preceding the at least one time segment having the anticipated user activity, and wherein the recording device is spun down after a second predetermined time past a last expected user activity when there was no anticipated user activity between a current time and the second predetermined time, wherein the second time predetermined time is automatically extended to equal a current program's running time, the current program's running time being estimated using program guide information and historical data for a television channel being received by the recording device, and wherein a greater number of days within the memory bin having user activity indicates a greater probability the patterns of user behavior predicts user activity.

18. The recording device of claim 17, wherein determining patterns of user behavior comprises determining a time period to perform routine maintenance on the recording device over a subscriber television system based on the lack of user activity during time segments that comprise the collection period.

19. The recording device of claim 17, wherein recording user data during the collection period comprises recording the television channel that is showing a television show being received by the recording device.

20. The recording device of claim 17, wherein recording user data during the collection period comprises recording whether a user depresses a rewind, fast forward, or pause key.

21. The recording device of claim 17, wherein operating the time shift buffer in accordance with the determined patterns of user behavior comprises placing the time shift buffer in a rest state during periods of time in which the determined patterns of user behavior indicate the recording device is not in use.

22. The recording device of claim 17, wherein operating the time shift buffer in accordance with the determined patterns of user behavior comprises disabling the time shift buffer during periods of time in which the determined patterns of user behavior indicate a user does not rewind, pause or fast forward while viewing a television show.

23. The recording device of claim 17, wherein operating the time shift buffer in accordance with the determined patterns of user behavior comprises enabling the time shift buffer during periods of time in which the determined patterns of user behavior indicate a user rewinds, pauses or fast forwards while viewing a television show.

24. The recording device of claim 17, wherein operating the time shift buffer in accordance with the determined patterns of user behavior comprises enabling the time shift buffer for a particular television show or a particular type of television show when the determined patterns of user behavior indicate a user watches the particular television show or the particular type of television show.

* * * * *